United States Patent

[11] 3,571,658

| [72] | Inventor | Walter Knoth<br>Oberengstringen, Switzerland |
| --- | --- | --- |
| [21] | Appl. No. | 875,404 |
| [22] | Filed | Nov. 10, 1969 |
| [45] | Patented | Mar. 23, 1971 |
| [73] | Assignee | Micafil A. G.<br>Zurich, Switzerland |
| [32] | Priority | Nov. 22, 1968 |
| [33] | | Germany |
| [31] | | P 18 10 500.5 |

[54] PROTECTIVE SYSTEM FOR CAPACITIVE VOLTAGE TRANSFORMERS INCLUDING A CIRCUIT FOR TfH-COUPLING
2 Claims, 1 Drawing Fig.

[52] U.S. Cl.................................... 317/14,
307/93, 307/104, 317/20, 317/50, 323/61, 323/66, 323/81
[51] Int. Cl........................................ H02h 7/04
[50] Field of Search............................ 317/12.1,
12.5, 14, 50, 20; 307/93, 104; 323/61, 66, 81

[56] References Cited
UNITED STATES PATENTS
3,458,764 7/1969 Gertsch et al................. 317/14

*Primary Examiner*—James D. Trammell
*Attorney*—Pierce, Scheffler and Parker

ABSTRACT: A capacitive voltage transformer comprises a transformer having its primary winding connected across an intermediate section of a plurality of capacity sections connected in series between a high voltage line and ground to form a voltage divider. The transformer is provided with a protective circuit which serves to switch in a protective damping burden on the transformer in the presence of transient oscillation phenomena, and the circuit connections between the transformer primary and the intermediate capacity section include a choke coil and a low-ohmic blocking coil to improve the transformer for coupling high frequency signals to the line for carrier type communication.

PATENTED MAR 23 1971
3,571,658
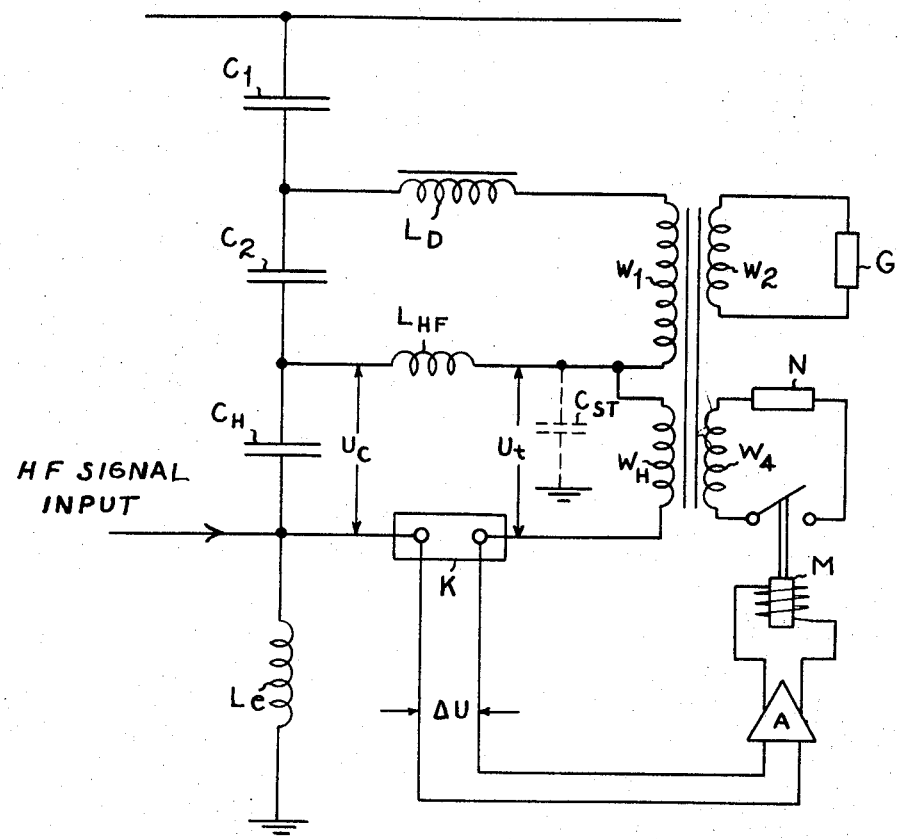
INVENTOR.
Walter Knoth
BY
Pierce, Scheffler & Parker
Attorneys

PROTECTIVE SYSTEM FOR CAPACITIVE VOLTAGE TRANSFORMERS INCLUDING A CIRCUIT FOR TfH-COUPLING

The present invention relates to a circuit arrangement for using a capacitive voltage transformer in accordance with the construction disclosed in my prior U.S. Pat. No. 3,458,764 granted Jul. 29, 1969, equipped with a differential protective circuit, for coupling high frequency (HF) signals to the high-voltage line or carrier type transmission which is known in the Germanic language by the abbreviation "TfH."

For coupling the HF signals on the low-voltage side, it has been customary to arrange a drainage coil of several $10^{12}$ H, between the capacitive divider and ground which has, with respect to the mains frequency, a negligible impedance and for the high frequency (HF) a negligible admittance. At the same time, it is necessary that the stray capacity towards ground appear, at the feeding point for the high frequency (HF) signals on the capacitive transformer, as low as possible. This requirement can be met in a simple manner as long as the capacitive part is subdivided into only two divider sections, which act as upper and lower capacity of the capacitive divider for the transformer, since in this case the inductive medium-voltage transformer is connected to the capacitive tap and ground, a compensation coil associated with the capacitive transformer being arranged between the divider tap and the transformer.

However, if a third divider section is required for the capacitive voltage divider, as in my prior U.S. Pat. No. 3,458,764, and if this third divider section is arranged on the ground side, the inductive medium-voltage transformer may no longer be grounded at one side, and in addition to the selection of the position for the third divider section, the conditions resulting from the carrier coupling must also be taken into account. In the case of the carrier coupling, the drainage coil is arranged between the third divider section and ground.

In contrast to the circuit having only two capacitive divider sections, however, the end of the primary winding on the ground side, which can have a high stray capacity towards ground due to its design, is connected with the upper end of the drainage coil by way of the third divider section.

The object of the present invention is to make the capacitive transformer with differential protective circuit suitable for carrier feeding, despite this stray capacity. This is achieved, according to the invention, in that a low-ohmic (HF) blocking coil, with a low stray capacity in longitudinal and transverse direction, is connected ahead of the ground-side primary connection of the transformer. The inductance of this coil is electrically a part of the compensation-inductance for the divider, and one can therefore divide the total compensation inductance in any desired manner between the known compensation coil and the blocking coil which is added.

One suitable embodiment of a capacitive transformer incorporating the invention will now be described in detail, and is illustrated in the accompanying drawing, the single figure of which is a schematic circuit diagram of the transformer and showing the manner in which the blocking coil is connected.

With reference now to the drawing, which illustrates an embodiment similar to that depicted in FIG. 3 of my previous U.S. Pat. No. 3,458,764, $C_1$, $C_2$ and $C_H$ designate three capacity divider sections connected in series, the upper capacity section $C_1$ being connected to a high voltage line, and the lower capacity section $C_H$ being connected to ground through a drainage coil $L_e$. The medium-voltage transformer is designated T.

The upper end of the primary winding $W_1$ of this transformer is connected to a point on the capacity divider string intermediate capacity sections $C_1$ and $C_2$ through a core type compensation choke coil $L_D$ and the lower end of the primary winding is connected through a HF blocking coil $L_{HF}$ to a point on the capacity divider string intermediate capacity sections $C_2$ and $C_H$. The secondary for the transformer is indicated at $W_2$ and its output terminals are connected to the load, generally indicated by letter G.

As explained in my previously mentioned patent, means are provided for comparing a reference voltage on a section of the capacitive divider with a voltage in the inductive circuit on the transformer. A suitable reference voltage $U_c$ is that which obtains across the divider section $C_H$, and the voltage in the inductive circuit is provided by a tertiary winding $W_H$ on transformer T connected to the lower end of primary winding $W_1$, the voltage across this tertiary winding being designated by $U_t$. Under normal service conditions this latter voltage shall have the same amplitude as that of the reference voltage $U_c$ and is almost coincident in phase.

The two voltages are connected in opposition, i.e. in a subtractive manner, and the difference voltage output $\Delta U$ at the terminals K, is applied to the input of an amplifier unit A. The resulting difference $\Delta U$ is, in normal operation, as small as possible and is caused only by the useful secondary burden, load G, normally an impedance with an inductive power factor. In the event that undesired oscillations occur in the inductive circuit, the difference voltage $\Delta U$ will considerably exceed its normal minimal value and can then be used as a tripping signal at the output of the amplifier A for actuating a switching relay M to connect in a damping burden N to another secondary winding $W_3$.

The stray capacity with respect to ground is indicated on the drawing by capacity $C_{st}$.

In accordance with the invention the low-ohmic HF blocking coil $L_{HF}$, with its low stray capacity in longitudinal and transverse direction is seen to be connected ahead of the groundside connection of the primary winding of transformer T, e.g. to a point on the divider intermediate capacity sections $C_2$ and $C_H$. As previously stated, the inductance of the blocking coil $L_{HF}$ is electrically a part of the overall compensation inductance and hence the latter may be divided in any desired manner as between the two coils $L_D$ and $L_{HF}$.

Coil $L_{HF}$ can have the same inductance value as that of the drainage coil $L_e$. However, its inductance can also be greater than that of the drainage coil provided that the stray capacity and the self-capacity are lower. It is only necessary that the compensation inductance correlated to the capacitive divider be equal to the combined inductances of the two coils $L_D$ and $L_{HF}$.

The high frequency signals to be carried over the high voltage line are fed into the capacitive divider at the point indicated by the arrow, i.e. at a point intermediate capacitive section $C_H$ and the drainage coil $L_e$.

I claim:

1. In a capacitive voltage transformer arrangement the combination comprising at least three capacity voltage divider sections connected in series, circuit means connecting one end of said series connected capacity sections to a high voltage line, circuit means including a drainage coil connecting the other end of said series connected capacity sections to ground, a feed-in connection for coupling high frequency signals to said high voltage line on said capacitive divider between said drainage coil and the adjacent capacity divider section, a transformer having its primary winding connected across an intermediately located capacity section in said series, a compensation choke coil connected in the circuit extending between one end of said primary winding and said intermediately located capacity section, a low-ohmic HF blocking coil connected in the circuit extending between the other end of said primary winding and said intermediately located capacity section to adapt said transformer arrangement for carrier coupling, said transformer including a secondary winding for connection to a desired load and a tertiary winding connected at one end thereof to said other end of said primary winding for producing a comparison voltage, means tapping from said capacity voltage divider a voltage which during normal operation only of said transformer is substantially equal in amplitude and phase with said comparison voltage, means for producing a difference voltage equal to the difference between said two voltages, and switching means responsive to said difference voltage for switching in a damping burden on said transformer thereby to protect said transformer against undesired oscillation effects.

2. A capacity voltage transformer arrangement as defined in claim 1 wherein said low-ohmic HF blocking coil has a low stray capacity in longitudinal and transverse directions.